(12) United States Patent
Pan

(10) Patent No.: US 8,014,409 B1
(45) Date of Patent: Sep. 6, 2011

(54) VIRTUAL ROUTER IDENTIFIER THAT SPANS MULTIPLE INTERFACES IN A ROUTING DEVICE

(75) Inventor: Xiaohong Pan, Fremont, CA (US)

(73) Assignee: Foundry Networks, LLC, San Jose, CA (US)

( * ) Notice: Subject to any disclaimer, the term of this patent is extended or adjusted under 35 U.S.C. 154(b) by 302 days.

(21) Appl. No.: 12/130,721

(22) Filed: May 30, 2008

Related U.S. Application Data

(60) Provisional application No. 60/932,408, filed on May 30, 2007.

(51) Int. Cl.
*H04L 12/56* (2006.01)
(52) U.S. Cl. .......... 370/401; 370/221; 370/228
(58) Field of Classification Search .......... 709/238; 370/401, 400, 357, 351, 216–228
See application file for complete search history.

(56) References Cited

U.S. PATENT DOCUMENTS

| | | | | |
|---|---|---|---|---|
| 2002/0184387 | A1* | 12/2002 | Yamaya et al. | 709/238 |
| 2003/0037165 | A1* | 2/2003 | Shinomiya | 709/238 |
| 2004/0085965 | A1* | 5/2004 | Fotedar | 370/395.31 |
| 2004/0165604 | A1 | 8/2004 | Oh et al. | |
| 2004/0240455 | A1* | 12/2004 | Shen | 370/400 |
| 2005/0249113 | A1 | 11/2005 | Kobayashi et al. | |
| 2007/0133472 | A1 | 6/2007 | Kim et al. | |

OTHER PUBLICATIONS

"BGP Route Flap Damping" Villamizar, et al. Standards Track Nov. 1998, 1-37.
"Virtual Router Redundancy Protocol (VRRP)" Ed. R. Hinden Standards Track Apr. 2004, 1-27.
Cisco IOS Software Releases 12.0 S "IP Event Dampening" http://www.cisco.com/en/US/docs/ios/12_0s/feature/guide/s_ipevdp.html.
ServerIron TraffficWorks L4-7 Configuration Guide Release 10.0.00a Release Date May 10, 2007, Publication Date May 10, 2007. Foundry Networks pp. 8-29-8-44.

* cited by examiner

*Primary Examiner* — Albert T Chou

(57) ABSTRACT

A virtual router spans a number of physical routing devices. One of the physical routing devices is designated as master, and the other physical routing devices are designated as back-ups to the master. The virtual router may be situated between a first local area network and a second local area network. A virtual router identifier can be associated with multiple interfaces on each of the physical routing devices.

20 Claims, 4 Drawing Sheets

400

410
In a Virtual Router, Designate a First Physical Router as Master and a Second Physical Router as Backup 420
Associate a VRID (VRID-M) with Multiple Interfaces on the First Router and with Multiple Interfaces on the Second Router

VIRTUAL ROUTER IDENTIFIER THAT SPANS MULTIPLE INTERFACES IN A ROUTING DEVICE

RELATED U.S. APPLICATION

This application claims priority to the copending provisional patent application Ser. No. 60/932,408, entitled "Virtual Router Redundancy Protocol Dampening and Spanning Multiple LANs," with filing date May 30, 2007, assigned to the assignee of the present application, and hereby incorporated by reference in its entirety.

This application is related to the copending U.S. patent application by X. Pan, Ser. No. 12/130,677, filed on May 30, 2008, entitled "Virtual Router Failover Dampening," assigned to the assignee of the present invention, and hereby incorporated by reference in its entirety.

BACKGROUND

A "virtual router" (an abstract representation of two or more physical routers acting as a group) can be used to increase the availability of a default gateway that services hosts on a subnet. At any given time, only one of the physical routers (a "first router") is actually routing network traffic for the host; the Internet Protocol (IP) address for the first router serves as the IP address for the virtual router, and the hosts use that IP address as their default gateway. If the first router is unable to satisfactorily service the hosts for some reason, then it can "failover" to another physical router (a "second router") that is spanned by the virtual router.

The Virtual Router Redundancy Protocol (VRRP) is used to assign responsibility for a virtual router to a physical router. According to VRRP, one of the physical routers in the group comprising the virtual router is assigned the highest priority (e.g., a value of 255) and consequently is identified as the owner or master, while the other physical routers in the group are assigned lower priorities and identified as backups. A backup can assume the role of master if the master cannot perform to a satisfactory level. If, for example, an interface (e.g., a port) on the master router (the first physical router) fails, then the priority of the first physical router may be reduced by an amount corresponding to the loss of that interface. If the first physical router's priority is reduced to less than the priority of the backup router with the next highest priority, then that backup (e.g., the second physical router) becomes the master.

Prior Art FIG. 1 is a block diagram showing a first physical routing device 110 and a second physical routing device 120 that service a first local area network (LAN) 131 and a second LAN 132. The first routing device 110 includes an interface 111 (e.g., a port) that is used for traffic between the routing device 110 and the first LAN 131, and an interface 112 that is used for traffic between the routing device 110 and the second LAN 132. Similarly, the second routing device 120 includes an interface 121 that is used for traffic between the routing device 120 and the first LAN 131, and an interface 122 that is used for traffic between the routing device 120 and the second LAN 132.

In the example of FIG. 1, a first virtual router 141 and a second virtual router 142 are defined. The first virtual router 141 spans both the first routing device 110 and the second routing device 120 and includes the interface 111 (on the device 110) and the interface 121 (on the device 120). Similarly, the second virtual router 142 also spans the first routing device 110 and the second routing device 120 but includes the interface 112 (on the device 110) and the interface 122 (on the device 120). Accordingly, a virtual router identifier (VRID) for the first virtual router 141 (VRID=1) is associated with the interfaces 111 and 121, and a VRID for the second virtual router 142 (VRID=2) is associated with the interfaces 112 and 122.

In the example of FIG. 1, the first routing device 110 is designated as master for both the virtual router 141 and the virtual router 142, while the second routing device 120 is designated as a backup to the first routing device 110 for both the virtual router 141 and the virtual router 142. Consider a situation in which the interface 111 fails for some reason such that, for the virtual router 141 (VRID=1), the first routing device 110 fails over to the second routing device 120—that is, the routing device 120 becomes the master for the virtual router 141 and the routing device 110 becomes a backup for the virtual router 141. However, the routing device 110 remains master for the virtual router 142 (VRID=2).

The situation just described can be problematic. According to VRRP, the backup must discard packets with a destination link layer MAC (Media Access Control) address equal to the virtual router MAC address, and must not accept packets addressed to the IP addresses associated with the virtual router. In general, according to VRRP, only the master can forward packets. Thus, after failover in the example of FIG. 1, packets that are being sent from the first LAN 131 to the second LAN 132 are first routed to the second routing device 120 (the master for the first virtual router 141). The second routing device 120 may either drop those packets or route them to the first routing device 110 (the master for the second virtual router 142) so that they can be forwarded to the LAN 132. Generally speaking, in the scenario just presented, traffic that is received from the LAN 131 into the routing device 120 is not sent out of that routing device.

SUMMARY

According to embodiments of the present invention, a virtual router identifier (which may be designated herein as "VRID-M," to distinguish it from a conventional VRID) can be associated with multiple interfaces on each of the physical routing devices. For example, a VRID-M can be associated with a first interface on a first physical routing device (the master), where the first interface is used for receiving packets from a first network (e.g., a LAN), and the same VRID-M can be associated with a second interface on the first physical routing device, where the second interface is used for forwarding packets to a second network (e.g., another LAN). The same VRID-M is also associated with first and second interfaces on a second physical routing device (a backup), where the first interface on the second device is used for receiving packets from the second network and the second interface on the second device is used for forwarding packets to the first network. As a result, should the first physical routing device failover to the second physical routing device, traffic that was routed through the first and second interfaces on the master will now be routed through the first and second interfaces on the backup. Thus, traffic that is received into a physical routing device is also sent out from that routing device. For example, before failover, traffic from the first network is received and sent by the first physical routing device; after failover, traffic from the first network is received and sent by the second physical routing device. Consequently, after failover, packets are not dropped, nor are packets unnecessarily routed from one physical routing device to another in order to be forwarded to their destination. These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The present invention is illustrated by way of example, and not by way of limitation, in the figures of the accompanying drawings and in which like reference numerals refer to similar elements.

Prior Art

DETAILED DESCRIPTION

Figure 1:
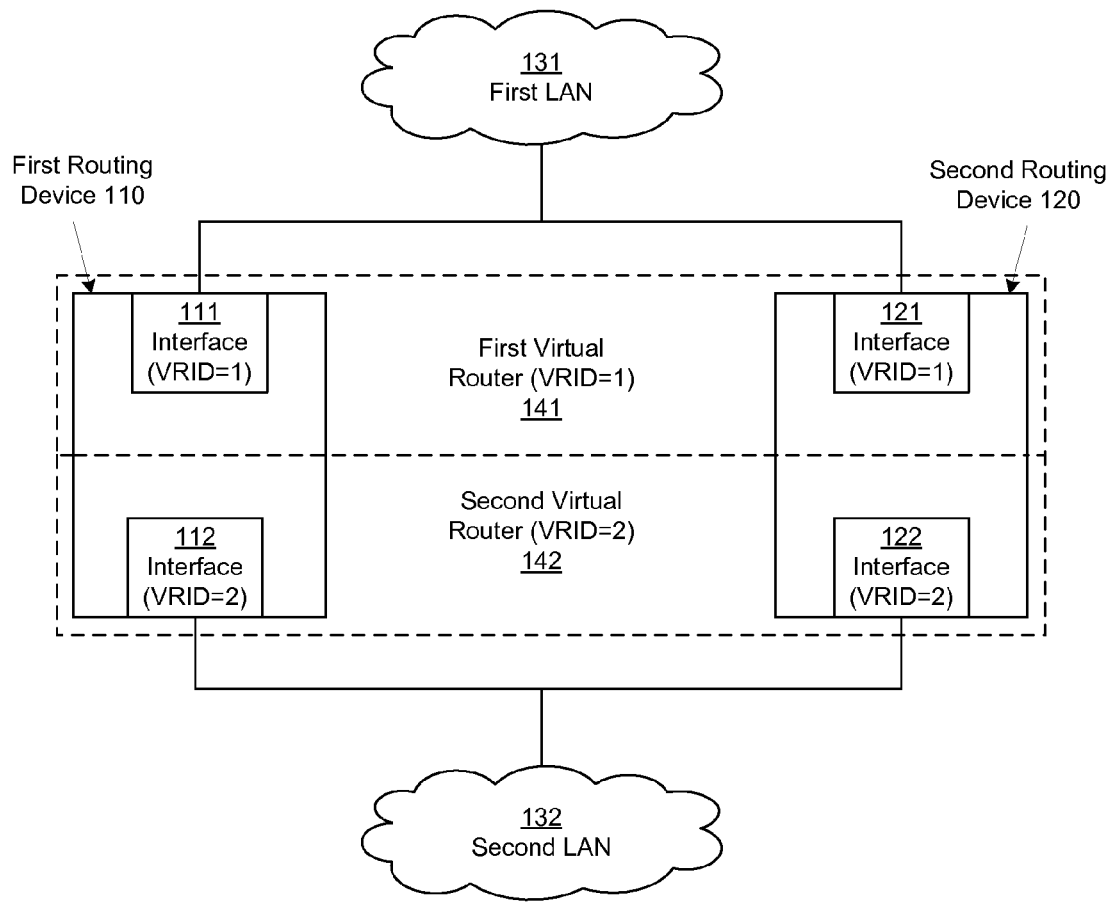
FIG. 1 is a block diagram showing a conventional virtual router implementation.

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," "designating," "implementing," "assigning," "forwarding," "associating," "transferring," "defining," "sending," "authenticating," "checking" or the like, refer to the actions and processes of a computer system, or similar electronic computing device (e.g., a routing device such as a router or switch), that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions or components residing on some form of computer-usable medium, such as program modules, executed by one or more computers or other devices. Generally, program modules include routines, programs, objects, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

Figure 2:
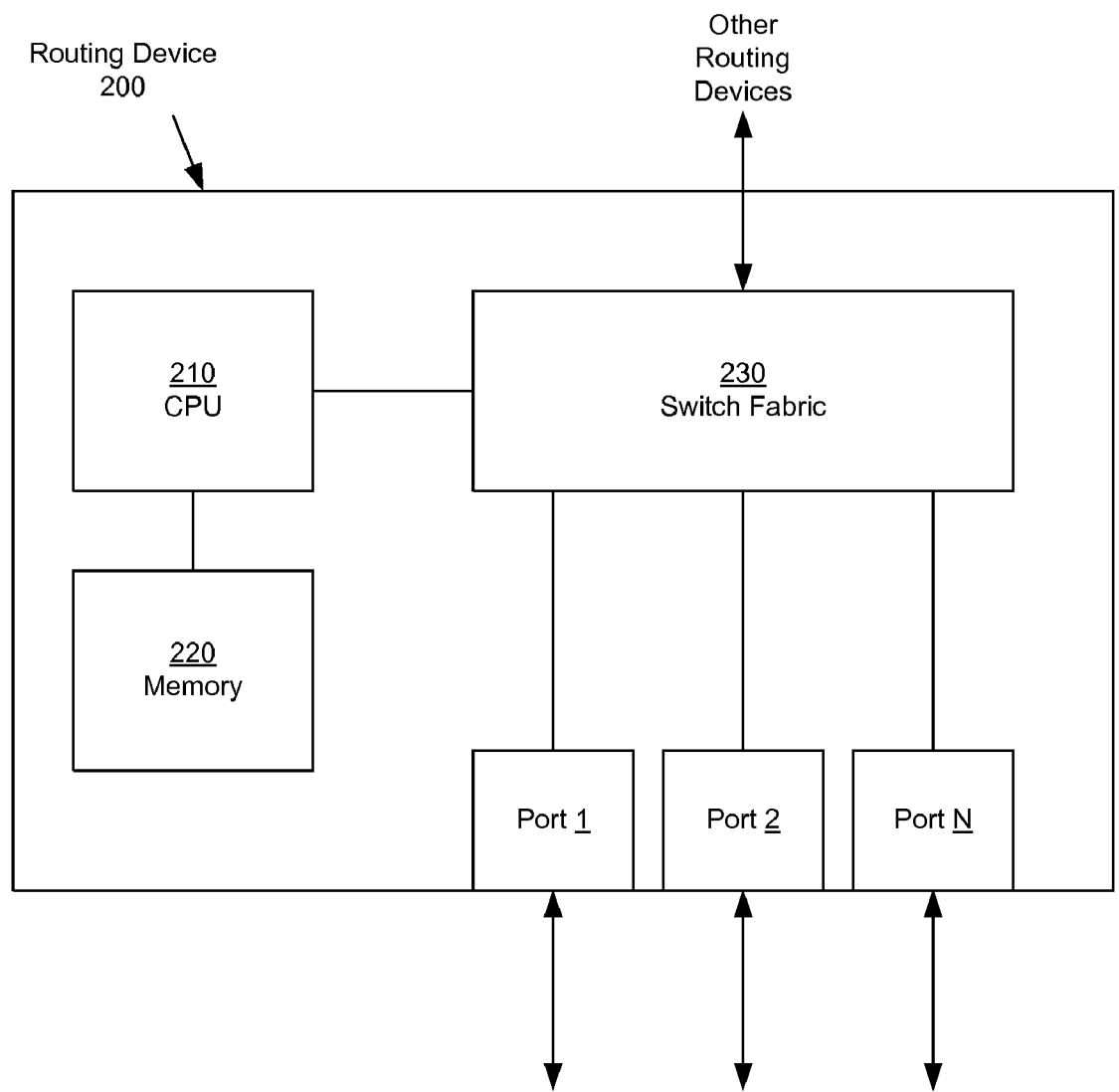
FIG. 2 is a block diagram showing an embodiment of a physical routing device that can be utilized in accordance with the present invention.

FIG. 2 is a block diagram showing selected elements of an embodiment of a physical routing device 200. Generally speaking, the routing device 200 is used to forward packets (data traffic) to its proper destination (e.g., another routing device or an end node). More specifically, the routing device 200 may be a physical router or switch that is coupled to, or is a part of, the Internet or an intranet (e.g., a LAN).

In the example of FIG. 2, the routing device 200 includes a central processing unit (CPU) 210, a memory 220, a switch fabric 230, and a number of ports 1, 2, . . . , N. The ports 1, 2, . . . , N are examples of what may be generally referred to as interfaces. The CPU 210, among its functions, provides hardware management functions, runs network control protocols, and executes the device's operating system. The memory 220, among its functions, stores instructions that can be executed by the CPU 210. The ports 1, 2, . . . , N provide connectivity to the Internet or intranet. The switch fabric 230 interfaces with the ports 1, 2, . . . , N and transfers packets between those ports, and may include packet processors, MAC (e.g., Media Access Control) and PHY (e.g., physical layer) devices, a traffic manager device, switching chips, a backplane and the like, implemented in ASICs (application-specific integrated circuits) and FPGAs (field-programmable gate arrays), and perhaps one or more CPUs operating on instructions stored in a memory. Also, the routing device 200 may be one of a number of routing devices that may be grouped (mounted) in a rack or chassis and that are in communication with one another. If so, the switch fabric 230 also interfaces with and facilitates the transfer of packets between the routing device 200 and those other routing devices. A routing device utilized in accordance with embodiments of the present invention can include elements not shown in FIG. 2 or described herein.

A virtual router can be configured to span a number of physical routing devices such as the routing device 200. A priority value is associated with the routing device 200 as well as with other physical routing devices that are part of the virtual router. Each physical routing device can have a different priority value. Each priority value is a user-specified value and, in one embodiment, may have value in the range of zero (0) to 255 (decimal). The physical routing device in the virtual router with the highest priority value is identified as the master for the virtual router, and other physical routing devices in the virtual router are identified as backups to the master. According to VRRP, when an interface on a physical routing device goes down (is out-of-service), then the priority of the physical routing device is changed to the priority associated with the out-of-service interface. According to an enhanced or extended version of VRRP referred to as VRRPE, which is offered by Foundry Networks, Inc. of Santa Clara, Calif. (www.foundrynet.com), if an interface on a physical routing device is out-of-service, then the routing device's priority is decremented by a priority value associated with that interface. If the routing device 100 is the master and if its priority value is reduced to less that the priority value of the backup with the next highest priority value, then that backup becomes master. The physical routing devices in a virtual router communicate with each other using "hello messages" (also known as advertisements). One of the parameters contained in the hello messages is the master's current priority value. If the master's priority value changes, then the backups become quickly aware of the change and can automatically begin a negotiation to determine which backup will become the new master, by comparing their respective priority values.

Figure 3:
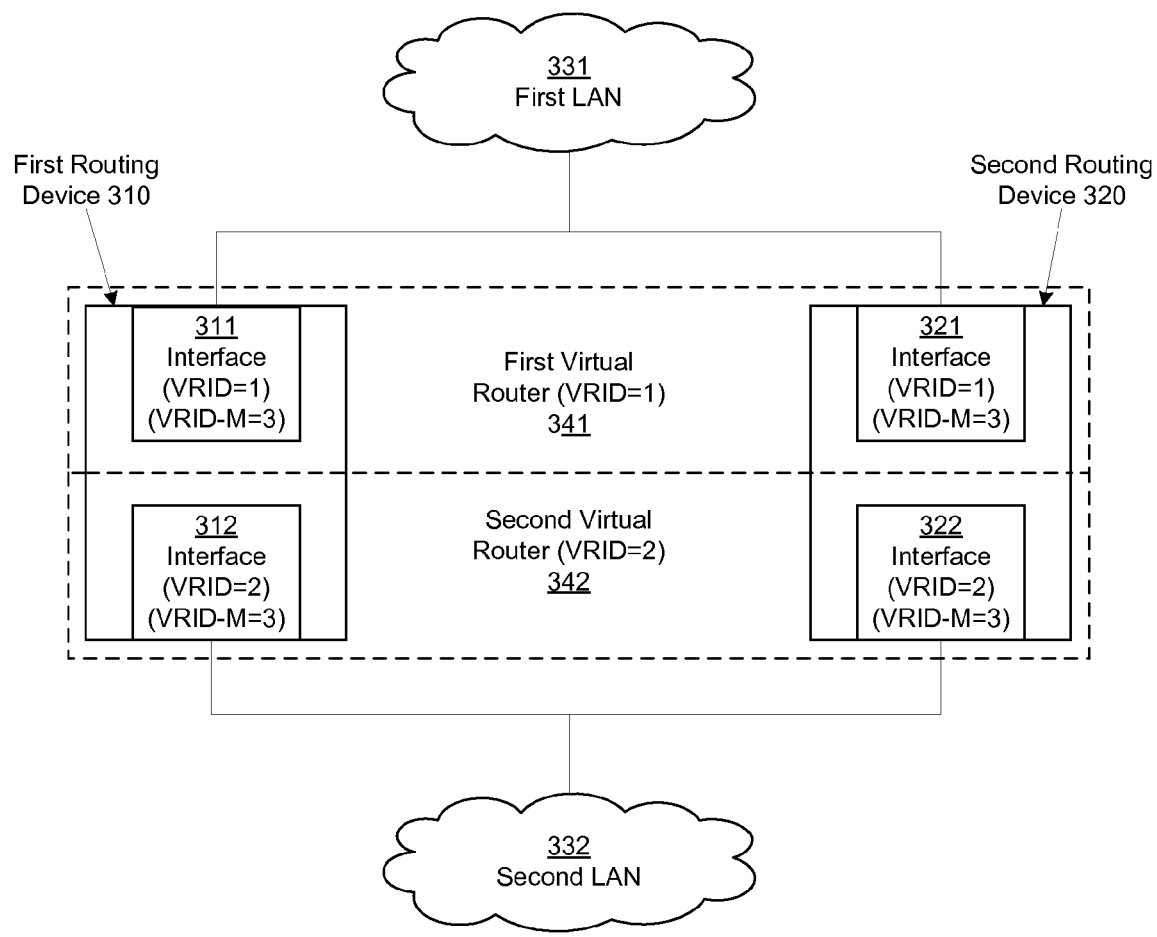
FIG. 3 is a block diagram showing a virtual router implemented according to an embodiment of the present invention.

FIG. 3 is a block diagram showing virtual routers 341 and 342 according to an embodiment of the present invention. The virtual routers 341 and 342 are each an abstract representation that spans multiple physical routers. In the example of FIG. 3, the virtual routers 341 and 342 span the physical routing devices 310 and 320, each of which may be exemplified by the routing device 200 of FIG. 2. A virtual router may encompass more than two physical routers.

In the example of FIG. 3, the first routing device 310 is initially designated as master for both the virtual router 341 and the virtual router 342, while the second routing device 320 is initially designated as a backup to the first routing device 310. As master, the physical routing device 310 will answer pings, Address Resolution Protocol (ARP) requests, and so on.

Failover—whereby the current or incumbent master (e.g., the physical routing device 310) and one of the backups swap roles—can occur when the priority value of the master is reduced to less than the priority value of a backup (specifically, the backup with the highest priority value, e.g., the physical routing device 320). "Hello messages," also referred to herein as advertisements, can also be used to determine if the master is still available. The backups wait for a period of time, referred to as the "dead interval," for a hello message from the master. If a backup does not receive the hello message within the dead interval, then it is presumed that the master is not available, and the backup with the highest priority value assumes the role of master.

The first routing device 310 includes an interface 311 (e.g., a port) that is used for traffic between the routing device 310 and a first network (e.g., the LAN 331), and an interface 312 that is used for traffic between the routing device 310 and a second network (e.g., the LAN 332). Similarly, the second routing device 320 includes an interface 321 that is used for traffic between the routing device 320 and the first LAN 331, and an interface 322 that is used for traffic between the routing device 320 and the second LAN 332. There may be more than two interfaces per routing device.

A virtual router identifier (VRID) is associated with each virtual router. A VRID is a user-specified value that, in one embodiment, has a value in the range of zero (0) to 255 (decimal). A virtual router is defined by its VRID and a set of Internet Protocol (IP) addresses—there is a mapping between the VRID for a virtual router and a selected set of IP addresses. In the example of FIG. 3, VRID=1 is associated with the virtual router 341, and VRID=2 is associated with the virtual router 342. The VRID for a virtual router is stored on each of the physical routing devices that constitute the virtual router.

The first virtual router 341 spans both the first routing device 310 and the second routing device 320 and includes the interface 311 (on the device 310) and the interface 321 (on the device 320). Similarly, the second virtual router 342 also spans the first routing device 310 and the second routing device 320 but includes the interface 312 (on the device 310) and the interface 322 (on the device 320). Accordingly, the VRID (VRID=1) for the first virtual router 341 is associated with the interfaces 311 and 321, and the VRID (VRID=2) for the second virtual router 342 is associated with the interfaces 312 and 322.

According to embodiments of the invention, a virtual router identifier (designated herein as "VRID-M" for ease of discussion, in order to distinguish it from a conventional VRID such as VRID=1 and VRID=2) can be associated with multiple interfaces on each of the physical routing devices 310 and 320. For example, a VRID-M (e.g., VRID-M=3) can be associated with the interface 311 on the routing device 310, and the same VRID-M (VRID-M=3) can be associated with the interface 312 on the routing device 310. In a similar manner, the same VRID-M (e.g., VRID-M=3) can be associated with each of the interfaces 321 and 322 on the routing device 320. In the example of FIG. 3, each VRID-M is associated with two interfaces per physical routing device; however, the present invention is not so limited. That is, a VRID-M can be associated with any number of interfaces per physical routing device.

According to VRRP and VRRPE, a virtual identifier has a value in the range of 0-255 (decimal). For compatibility with VRRP and VRRPE, a VRID-M can also be implemented as a value in the range of 0-255 (decimal) To simplify implementation, in one embodiment, the values of the VRID-M and the VRID associated with an interface should be different from each other, as in the example of FIG. 3.

In the example of FIG. 3, only the following configurations are possible (Case 2 is simply the converse of Case 1):

|  | Master | Backup |
|---|---|---|
| Case 1 | | |
| VRID-M = 3 | Device 310 | Device 320 |
| Case 2 | | |
| VRID-M = 3 | Device 320 | Device 310 |

In the example of FIG. 3, by mapping VRID-M=3 to VRID=1 and VRID=2, Cases 1 and 2 above correspond to the following configurations (that is, only the following configurations are possible):

|  | Master | Backup |
|---|---|---|
| Case 1 | | |
| VRID = 1 | Device 310 | Device 320 |
| VRID = 2 | Device 310 | Device 320 |
| Case 2 | | |
| VRID = 1 | Device 320 | Device 310 |
| VRID = 2 | Device 320 | Device 310 |

If, for example, the first routing device 310 fails over to the second routing device 320 (for Case 1; vice versa for Case 2), then the cases presented above become:

|  | Master | Backup |
|---|---|---|
| Case 1 (Failover) | | |
| VRID-M = 3 | Device 320 | Device 310 |
| Case 1 (Failover) | | |
| VRID = 1 | Device 320 | Device 310 |
| VRID = 2 | Device 320 | Device 310 |
| Case 2 (Failover) | | |
| VRID-M = 3 | Device 310 | Device 320 |
| Case 2 (Failover) | | |
| VRID = 1 | Device 310 | Device 320 |
| VRID = 2 | Device 310 | Device 320 |

Thus, for example, according to embodiments of the present invention, if the interface 311 (associated with VRID=1) is out-of-service for some reason, and this results in the virtual router 341 (VRID=1) failing over from the physical routing device 310 to the physical routing device 320, then the virtual router 342 (VRID=2) also fails over from the device 310 to the device 320. If instead the interface 312 (associated with VRID=2) is out-of service for some reason, and this results in the virtual router 342 (VRID=2) failing over from the physical routing device 310 to the physical routing device 320, then the virtual router 341 (VRID=1) also fails over from the device 310 to the device 320. In either case, traffic initially routed through the interfaces 311 and 312 is instead routed through corresponding interfaces (e.g., the interfaces 321 and 322) on the backup device.

Thus, traffic that is received into a physical routing device is also sent out from that routing device. In Case 1, for example, traffic that is received from the LAN 331 into the physical routing device 310 (the initial master) is also sent out by that device; if failover should occur, traffic that is received from the LAN 331 into the physical routing device 320 (the new master) is also sent out by that device.

According to embodiments of the present invention, configurations like the following are avoided (either before failover or after failover):

|  | Master | Backup |
|---|---|---|
| VRID = 1 | Device 310 | Device 320 |
| VRID = 2 | Device 320 | Device 310 |
| VRID = 1 | Device 320 | Device 310 |
| VRID = 2 | Device 310 | Device 320 |

Thus, problems such as those described previously herein are avoided.

As mentioned above, a VRID-M can be implemented as a value in the range of 0-255 (decimal). Also, as mentioned above, a VRID-M can be associated with multiple interfaces per physical routing device. According to VRRP and VRRPE, certain interface parameters are specified per VRID. Specifically, these interface parameters include IP addresses associated with the virtual router, authentication type (the type of authentication to be used), and authentication data (the type of authentication data specific to the selected authentication type). According to embodiments of the invention, these interface parameters are specified per interface per VRID-M. In other words, multiple sets of interface parameters may be specified for each value of VRID-M, each set of interface parameters corresponding to one of the interfaces associated with that value of VRID-M.

Also, according to embodiments described herein, advertisements (e.g., VRRP advertisements sent by the master to the backups, such as hello messages) are sent to all interfaces/LANs associated with a VRID-M instead of only a single interface/LAN (as would be the case with a conventional VRID). Furthermore, according to embodiments described herein, authentication of advertisements and IP addresses is performed on the interfaces/LANs that receive the advertisement (which may be more than a single interface/LAN).

Figure 4:
FIG. 4 is a flowchart of a computer-implemented method for managing virtual routers in one embodiment in accordance with the present invention.

FIG. 4 is a flowchart 400 of an example of a computer-implemented method (e.g., executed by a CPU operating on instructions retrieved from a storage medium such as a memory) for managing virtual routers in one embodiment in accordance with the present invention. Although specific steps are disclosed in the flowchart, such steps are exemplary. That is, embodiments in accordance with the present invention are well-suited to performing various other steps or variations of the steps recited in the flowchart 400. The steps in the flowchart may be performed in an order different than presented.

In block 410, with reference also to FIG. 3, a first virtual router 341 that spans two or more physical routing devices (e.g., the devices 310 and 32) is defined. One of the physical routing devices is designated as master, and the other physical routing device(s) are designated as backups. The master (e.g., the device 310) can include multiple interfaces (e.g., ports), where some of the interfaces (e.g., the interface 311) are associated with the first virtual router, and other interfaces (e.g., the interface 312) are associated with a second virtual router 342 that also spans the physical routing devices spanned by the first virtual router. The interfaces on the backups can be similarly configured.

In block 420, according to embodiments of the present invention, a VRID-M is associated with multiple interfaces (e.g., the interfaces 311 and 312) on the master, the VRID-M is associated with multiple interfaces (e.g., the interfaces 321 and 322) on a first backup, and so on. Each of the interfaces on the master, and each of the interfaces on the backups, may also be associated with one or more VRIDs. That is, there may be multiple VRIDs per interface, such that any interface may be associated with multiple virtual routers.

In one embodiment, multiple sets of interface parameters are specified for each VRID-M. For example, a first set of interface parameters are specified for one interface associated with the VRID-M, a different second set of interface parameters are specified for a second interface associated with the VRID-M, and so on.

As a consequence of the present invention, if the virtual router 341, for example, fails over from the current master to a backup, then the virtual router 342 also fails over from the device 310 to the device 320. As a result, traffic initially routed through, for example, the interfaces 311 and 312 is instead routed through corresponding interfaces (e.g., the interfaces 321 and 322) on the backup device.

Thus, traffic that is received into a physical routing device is also sent out from that routing device. Packets are not dropped, nor do packets received at one physical routing device have to be routed to another routing device in order to be forwarded to their destination.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A physical routing device that is configurable as a member of a virtual router, said physical routing device comprising:
    a central processing unit (CPU);
    a computer-readable medium having computer-executable instructions stored thereon, said instructions when executed by said CPU implementing a method of configuring said virtual router, said method comprising:
        receiving packets from a first network through a first interface of a first physical routing device and forwarding said packets to a second network through a second interface of said first physical routing device, wherein said first physical routing device is a member of both a first virtual router and a second virtual router;
        associating a first virtual router identifier (VRID) with said first interface and a second VRID with said second interface, said first and second VRIDs having different values, said first VRID associating said first interface with said first virtual router and said second VRID associating said second interface with said second virtual router; and
        associating a single third VRID with both said first interface and said second interface.

2. The physical routing device of claim 1 wherein said method further comprises transferring responsibility for receiving and forwarding said packets to a second physical routing device that is also a member of both said first virtual router and said second virtual router.

3. The physical routing device of claim 1 wherein said first virtual router and said second virtual router each span a second physical routing device comprising a third interface for forwarding packets to said first network and a fourth interface for receiving packets from said second network, wherein said first VRID is associated with said third interface and said second VRID is associated with said fourth interface, and wherein the same said third VRID is associated with both said third interface and said fourth interface.

4. The physical routing device of claim 1 wherein said method further comprises defining multiple sets of interface parameters for said third VRID, said sets of interface parameters comprising a first set for said first interface and a different second set for said second interface.

5. The physical routing device of claim 4 wherein said interface parameters comprise Internet Protocol (IP) addresses associated with said first virtual router and with said second virtual router.

6. The physical routing device of claim 4 wherein said interface parameters comprise authentication type and authentication data used for validating said packets.

7. The physical routing device of claim 1 wherein said method further comprises sending an advertisement from said first physical routing device to multiple interfaces on a backup router that is a member of both said first virtual router and said second virtual router, said advertisement indicating availability of said first physical routing device.

8. A non-transitory computer-readable medium having computer-executable code stored thereon for causing a routing device to perform a method of configuring a virtual router that spans a plurality of physical routing devices, said method comprising:
    designating a first physical routing device of said virtual router as master, said first physical routing device comprising a first interface for a first network and a second interface for a second network, wherein a second physical routing device of said virtual router is designated as a backup to said master, said second physical routing device comprising a third interface for said first network and a fourth interface for said second network; and
    associating a virtual router identifier (VRID) with both said first interface and said second interface, wherein said VRID is also associated with both said third interface and said fourth interface.

9. The non-transitory computer-readable medium of claim 8 wherein said method further comprises:
    defining a first plurality of interface parameters for said VRID, said first plurality of interface parameters comprising a first set for said first interface and a different second set for said second interface; and
    defining a second plurality of interface parameters for said VRID, said second plurality of interface parameters comprising a third set for said third interface and a different fourth set for said fourth interface.

10. The non-transitory computer-readable medium of claim 9 wherein said interface parameters comprise Internet Protocol (IP) addresses associated with said virtual router.

11. The non-transitory computer-readable medium of claim 9 wherein said interface parameters comprise authentication type and authentication data used for validating packets.

12. The non-transitory computer-readable medium of claim 8 wherein said method further comprises sending an advertisement from said first physical routing device to both said third interface and said fourth interface, said advertisement indicating availability of said first physical routing device.

13. The non-transitory computer-readable medium of claim 12 wherein said method further comprises authenticating said advertisement at said third interface and at said fourth interface.

14. The non-transitory computer-readable medium of claim 12 wherein said method further comprises checking an IP address provided by said advertisement, said checking performed at said third interface and at said fourth interface.

15. A physical routing device comprising:
a central processing unit (CPU);
a first plurality of interfaces coupled to said CPU and operable for receiving packets from a first network and forwarding said packets to a second network; and
a computer-readable medium having computer-readable instructions stored therein that are executable by said CPU, said instructions being executable to configure a virtual router comprising said physical routing device and at least a second physical routing device, wherein a virtual router identifier (VRID) is associated with each interface in said first plurality, wherein said VRID is also associated with each interface in a second plurality of interfaces of said second physical routing device.

16. The routing device of claim 15 wherein a set of interface parameters is defined for each interface in said first plurality and for each interface in said second plurality.

17. The routing device of claim 16 wherein said interface parameters comprise Internet Protocol (IP) addresses associated with said virtual router.

18. The routing device of claim 16 wherein said interface parameters comprise authentication type and authentication data used for validating packets.

19. The routing device of claim 15 operable to send an advertisement to each interface in said second plurality, said advertisement indicating availability of said physical routing device.

20. The virtual router of claim 19 wherein each interface in said second plurality that receives said advertisement authenticates said advertisement and checks an IP address provided by said advertisement.

* * * * *